Oct. 6, 1964 J. T. RENSCH ETAL 3,151,779
SELF-LOCKING HOPPER ATTACHMENT
Filed Dec. 5, 1962
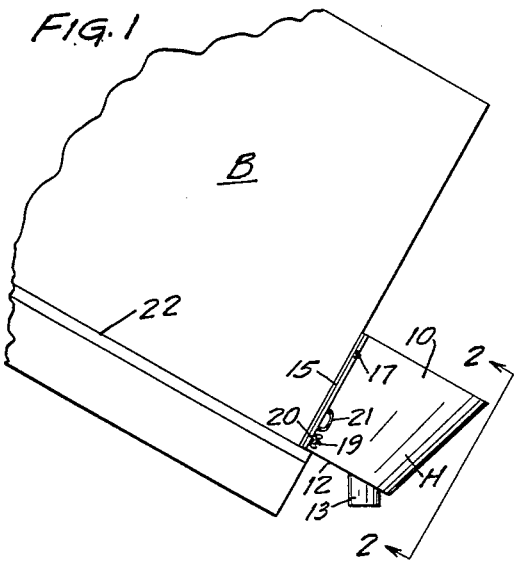
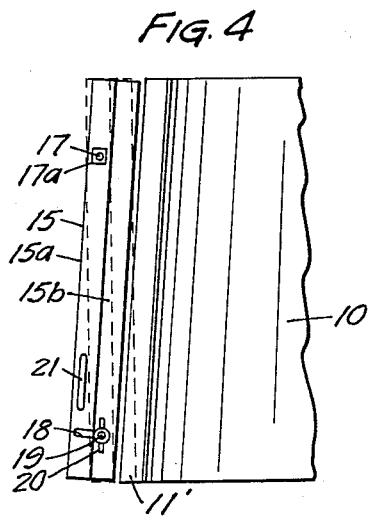
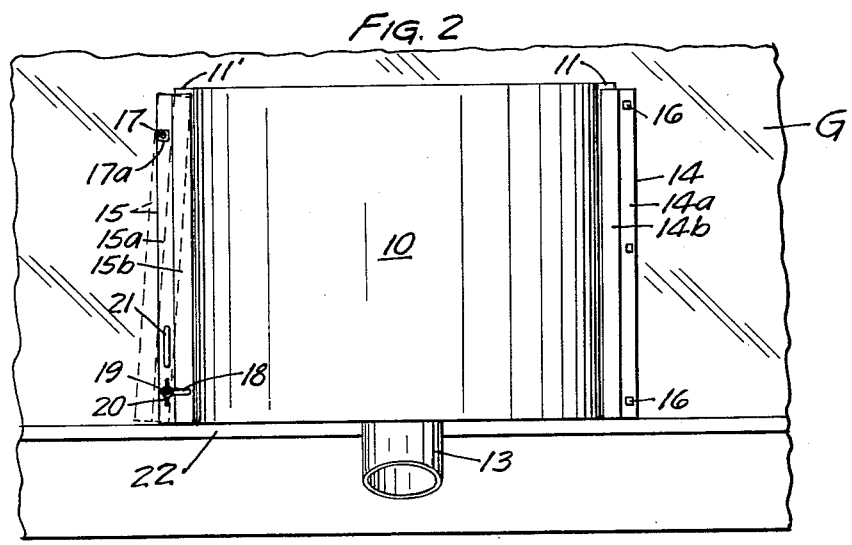
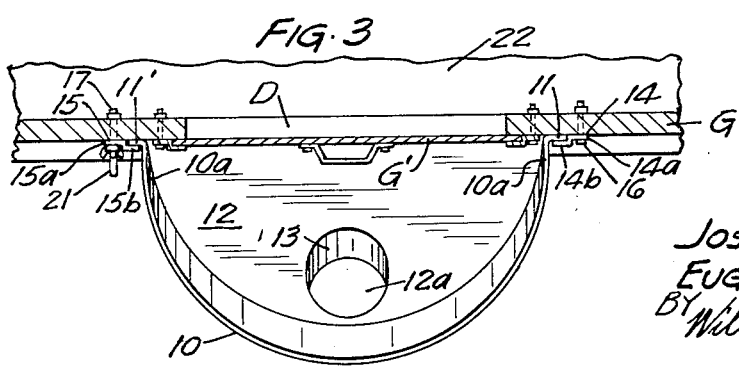
INVENTORS
JOSEPH T. RENSCH
EUGENE F. RENSCH
BY Williamson & Palmatier
ATTORNEYS United States Patent Office 3,151,779
Patented Oct. 6, 1964

3,151,779
SELF-LOCKING HOPPER ATTACHMENT
Joseph T. Rensch and Eugene F. Rensch, Makoti, N. Dak.
Filed Dec. 5, 1962, Ser. No. 242,498
14 Claims. (Cl. 222—181)

This invention relates to material conveying means or devices which are mountable on storage structures for controlling and guiding the flow of fluent material entering or leaving said structure, and in particular to an improved hopper for controlling the discharge of fluent granular material from dump trucks, storage bins and the like and to novel improved means for mounting the same on the structures from which the material is to be discharged.

An object of this invention is to provide novel material conveying means of the type above described and novel means for quickly and easily mounting same on the structure with which it is to be used.

Another object is to provide a novel hopper and mounting means therefor of simple and inexpensive design, construction and operation which is capable of being quickly and detachably mounted on existing storage structures such as dump trucks and storage bins having gated openings in the walls thereof and in which the hopper and mounting means therefor cooperate to provide an automatic self-locking feature.

Still another object is provide novel means for removably mounting a hopper body on the wall of a storage structure in direct opposition to an opening formed therein whereby the mounting and dismounting of said hopper can be entirely accomplished while maintaining said hopper in direct opposition to said opening.

Still another object is to provide a novel automatic self-locking hopper attachment which when mounted is free to slide upwardly when pushed from below so as to prevent damage to the hopper or to the object which it encounters creating the upward force thereon such as when the hopper is mounted on the back of a tiltable structure such as the box of a dump truck.

Still another object is to provide a novel hopper structure which is so designed as to always deliver the material away from the structure on which it is mounted, which feature is particularly important when the hopper is used with tilting structures such as dump trucks so as to prevent the material being discharged towards the truck and thereunder so as to avoid spillage and contamination of the material.

These and other objects and advantages of this invention will more fully appear from the following description made in connection with the accompanying drawings wherein like reference characters refer to the same or similar parts throughout the several views, and in which:

FIG. 1 is a side elevational view of a hopper constituting one preferred embodiment of this invention mounted on the end gate of a dump truck;

FIG. 2 is a rear elevational view of FIG. 1;

FIG. 3 is a top plan view; and

FIG. 4 is a somewhat schematic detail view illustrating the relative positions of the hopper and the mounting means therefor during the mounting or dismounting of the hopper.

Reference is now made to the accompanying drawings for a more detailed description of this invention.

In FIG. 1, a hopper H of this invention is shown mounted on the tail gate G of the dump box B of a dump truck, the box being shown in an elevated or tilted position. However, it will be understood that the hoppers of this invention are not limited to use with dump trucks, but may be used with any material storage structure such as bins and the like having a gated opening in the sides thereof for discharging material therefrom. The tail gate has a discharge opening D formed therein and a sliding gate member G' for opening and closing same.

The hopper body includes a semi-annular, arcuate or generally U-shaped side wall 10, the free ends 10a thereof being adapted to abut with the end gate G on opposite sides of the gated opening D, said free end portions defining an opening in the hopper body for the entry of material into same from the discharge opening D. These free end portions are provided with elongate laterally outwardly extending flange portions 11—11' for mounting the hopper on the supporting structure in a manner hereinafter to be described. The side wall may be formed of any suitable material such as sheet metal, and is sufficiently elastic or resilient in nature whereby the top or upper portion thereof can be compressed, bowed, deformed or flexed for mounting and dismounting in a manner hereinafter to be described, the upper portion springing back to its normal illustrated operative configuration when released. The hopper also includes a bottom 12, the inner edge of which is co-extensive with the free end portions 10a and flanges 11—11' of the side wall, the juncture of the wall 10 and bottom 12 being sealed to prevent leakage of material therebetween. A discharge opening 12a is formed in the bottom adjacent the outer marginal edge thereof, said bottom having mounted thereon a downwardly extending discharge spout 13 which encompasses said discharge opening 12a and is in flow communication therewith.

The bottom and discharge spout are preferably so arranged and designed to insure that the material issuing from the spout 13 is always directed either directly downwardly or away from the supporting structure and never towards the supporting structure. This is particularly important when the hopper is to be mounted on a tiltable structure such as the box of a dump truck as illustrated in the accompanying drawings. When the hopper is to be mounted on a stationary storage structure having vertical side walls, the bottom of the mounted hopper is preferably slightly downwardly and outwardly inclined so as to assure a steady flow of material to the discharge spout, with the discharge spout being preferably designed so as to direct the material either directly downwardly or rearwardly of the supporting structure. When mounted on a tilting structure as illustrated, the spout 13 is preferably angularly offset from the bottom and inclines downwardly and rearwardly at such an angle that even when the box is in maximum elevated position, the spout never passes the vertical position whereby the material during all stages of the tilting of the box is directed either rearwardly or at the most directly downwardly by the discharge spout but never forwardly towards the truck, thus preventing spillage and contamination of the material being transferred. Thus, when used with tilting structures, the bottom of the hopper is so designed as to tilt downwardly when the structure is completely raised, and the spout is so inclined with respect to the bottom as to assure rearward or at best vertical discharge of material therefrom. This assures substantially complete emptying of the hopper, and frees the flow of grain therefrom. Many gates which enclose the discharge opening of the storage structure are provided with swingable handles for operating same. In such instances, the bottom must be so designed as not to interfere with the movement and operation of this handle.

To mount the hopper H on the supporting structure, a pair of elongate mounting members or straps 14 and 15 are provided which are vertically mounted on the wall of the supporting structure on opposite sides of the opening therein. These members or straps are designed to provide grooves, slots or tracks for slidably receiving and engaging the flanges 11—11' of the hopper. In the arrangement shown, the members 14 and 15 are of similar shape and design and each include parallel offset portions 14a—14b and 15a—15b respectively, portions 14a and 15a being adapted to be mounted directly against and flush with the face of the wall of the supporting structure, the portions 14b and 15b being adapted to be in spaced relationship with respect to said supporting wall structure to define therewith opposed vertically extending grooves, tracks or ways for slidably receiving the flanges 11—11' of the hopper. Portion 14a is provided with a plurality of apertures therein for receiving suitable fasteners 16 for fixedly mounting the member 14 on the supporting wall whereby the member 14 remains stationary during use. The other member 15 is hingedly or pivotally mounted on the supporting wall structure by means of a pivot member or bolt 17 which is located intermediate the ends of said member a sufficient distance below the upper edge of the member 15 so as to permit a camming action when the upper end of the strap 15 located above the pivot bolt is engaged by the hopper in a manner hereinafter to be described, the pivot bolt 17 extending through a suitable opening provided in the portion 15a of the strap member 15 and being provided with a self-locking nut 17a to enable the member 15 to remain freely swingable at all times. The lower end of the member 15 is provided with an elongate transversely disposed slot 18, said slot receiving an outwardly extending bolt 19 having a releasable locking element such as the wing nut 20 mounted thereon. If desired, a suitable hand grip or handle 21 may also be mounted on the lower portion of the strap member 15 for convenience in operating or swinging same during mounting and dismounting of the hopper.

Thus, the strap member 15 is so mounted as to be freely pivotable about the pivot bolt 17 whereby the lower end portion thereof can be swung outwardly to the inclined dotted line position shown in FIG. 2 and the inclined position to FIG. 4 so as to be normally free and clear of and disengaged from the lower portion of the left hand hopper flange 11'.

To mount the hopper on the supporting structure, the members 14 and 15 are mounted on the supporting wall in the manner hereinbefore described. The right hand flange 11 of the hopper is then laterally inserted from the side into the groove provided by 14b of the member 14. The lower portion of the strap 15 below the pivot 17 is then swung outwardly away from the hopper and away from and out of overlapping engageable relationship with the lower portion of flange 11' and strap 15 assumes the inclined position shown in FIGS. 2 and 4, this movement causing a corresponding inward movement of the upper portion of the strap 15 located above the pivot bolt 17. The top or upper portion of the hopper wall 10 is then compressed or bowed inwardly by pushing the upper left hand portion thereof towards the right sufficiently so that the flange 11' clears the strap 15 and assumes the inclined position of FIG. 4 in which the strap 15 and flange 11' are correspondingly inclined in disengaged non-overlapping opposed relationship. The flange 11' is then aligned with the slot provided by 15b to permit insertion of the left hand flange 11' in strap 15. When the hopper side wall 10 is flexed or bowed as described above to move the flange 11' to an inclined tilted position for mounting or dismounting, the flexed wall is tensioned because of its inherent resiliency and biases the flange 11' towards its normal vertical operative position, and, when released, springs back of its own volition to said normal operative position. Thus, when the strap 15 and flange 11' have each been tilted to the inclined opposed aligned non-overlapping relationship hereinabove described, the upper left hand portion of the hopper side wall is then released, enabling the upper left hand portion of the hopper wall to automatically spring back to its normal position. As the upper left hand portion of the hopper returns to its normal position, it engages and presses against the upper end of the strap 15 located above the pivot 17 and causes a cam action thereon, thereby pushing said upper end of the strap outwardly and forcing the lower end of the strap located below the pivot 17 inwardly to its normal vertical upright position and into enclosing overlapping engagement with the entire length of the flange 11' to maintain and support the hopper in proper mounted operative position on the tail gate. When so mounted, the left side of the hopper is contiguous with the strap 15 and is capable of engaging same above and below the pivot 17 to thereby limit the swinging movement thereof and prevent the strap 15 from becoming unintentionally disengaged from the flange 11'.

The swingable strap 15 and the left hand side of the hopper are so cooperatively related when mounted as above described and illustrated as to maintain the strap in locked overlapping relationship with the flange 11' during use and requires no additional means to maintain the hopper in properly mounted relationship during normal use. However, as an added safety precaution, the wing nut may be tightened on the bolt 19 once the strap 15 is in proper position to positively lock the strap 15 in place during use in the event that the hopper is subjected to extreme pressures or abnormally heavy loads.

It will, of course, be understood that the dismounting operation is simply the reverse of the aforementioned mounting operation. It will be further understood that in the arrangement illustrated, the truck floor 22 which projects rearwardly of the tail gate G limits the downward displacement of the hopper and maintains it in the desired operative position. However, any other suitable rest or abutment surface or means may be employed to limit the downward displacement or movement of the hopper.

Once mounted as hereinbefore described, the flanges 11 and 11' are free to slide upwardly relative to the mounting members 14 and 15. This enables the hopper to yield and freely slide upwardly when subjected to an upwardly directed force, which feature is particularly important when the hopper is mounted on a tilting structure such as the box of a dump truck. Thus, if the hopper during use should encounter an obstruction as the box is being raised, it can yield when engaging such obstruction so as to prevent damage thereto or to the obstruction encountered. The upper ends of the guide slots provided by the straps 14 and 15 are open, whereby the flanges may be inserted endwise from above and removed in the same fashion where such is desirable or practical.

The hopper is provided with an open top and is of such size and shape as to permit easy access to and operation of the gate in the wall of the storage structure after mounting of the hopper thereon.

The novel hopper and mounting means of this invention enable the hopper to be mounted while maintaining same in direct opposition to the gated discharge opening of the storage structure, and does not require insertion into the mounting means from above although such can be done if the design and construction of the storage structure so permits. However, many storage structures are so designed and constructed as to make insertion from the top difficult or impossible and therefore this invention obviates this problem by enabling the hopper to be mounted directly from in front.

From the foregoing, the advantages of this invention are readily apparent. The hopper and mounting means therefor are of simple and relatively inexpensive design and construction, and are so designed as to enable the hopper to be mounted and dismounted while maintained directly in front of and in direct opposition to the gated discharge opening of the storage structure and is so designed as to enable the mounting or dismounting thereof to be accomplished very simply in a matter of seconds.

This invention further provides a novel automatic self-locking feature, enables the hopper to be free to yieldingly slide upwardly if pushed from below to prevent damage thereto during use, and is further so designed as to permit easy access to and operation of the gate. The hopper design is also such as to assure a steady flow of material to the spout, assures substantially completely emptying of the hopper, and also frees the flow of grain from the hopper through the discharge spout thereof, and further assures that the grain will be discharged away from the supporting structure or truck to prevent spillage or contamination of the material.

Although the disclosure has been directed particularly to a device for controlling the discharge of material from a storage structure, it is to be understood that the invention is not necessarily limited thereto, and includes within its scope devices for controlling the flow of material into said structures.

It will, of course, be understood that various changes may be made in the form, details, arrangement and proportions of the various parts without departing from the scope of our invention.

What we claim is:

1. Material conveying means for use with a supporting wall having an opening therein for the passage of fluent material therethrough, said means comprising hopper means having resilient wall structure and means mountable on said supporting wall for mounting said hopper thereon, said mounting means providing first fastening means on opposite sides of said opening, said resilient wall structure carrying second fastening means adapted for cooperative engagement with said first fastening means for mounting sad hopper means on said mounting means and supporting wall, said second fastening means being movable relative to each other and said first fastening means in response to flexing of said resilient wall structure between a first position in which said fastening means are capable of cooperative engagement and a second position in which said fastening means are capable of being disengaged and said resilient wall structure is tensioned such as to bias said second fastening means towards and into said first position when released for free movement, the mounting means on one side of said opening being pivotally mountable on said supporting wall, the pivot axis thereof being located intermediate the ends thereof, said hopper means when mounted on said mounting means being capable of engaging said pivotally mounted mounting means on both sides of the pivot axis thereof for limiting the free swinging movement thereof and maintaining said pivotally mounted mounting means in cooperative mounting engagement with its respective second fastening means.

2. The material conveying means of claim 1, wherein one of the fastening means on each side provides elongate guide track means and the other of said fastening means on each side is freely slidable longitudinally of said track means when cooperatively engaged therewith for free movement of said hopper means relative to said supporting wall when mounted thereon.

3. The material conveying means of claim 1, including releasable locking means for positively holding said pivotally mounted mounting member against movement when said hopper means is in mounted engagement therewith.

4. The material conveying means of claim 2, including releasable locking means for positively holding said pivotally mounted mounting means against movement when said hopper means is in mounted engagement therewith.

5. Material conveying means for use with a supporting wall having an opening therein for the passage of fluent material therethrough, said means comprising hopper means having resilient wall structure, mounting means mountable on said supporting wall on opposite sides of said opening for mounting said hopper means on said wall, the mounting means on one side of said opening being pivotally mountable for free swinging movement about an axis disposed intermediate the ends thereof, said mounting means providing first fastening means on opposite sides of said opening, said first fastening means facing in opposite directions, said resilient wall structure carrying second fastening means on opposite sides thereof adapted for cooperative mounting engagement with said first fastening means, said second fastening means facing in opposite directions from each other and in opposite directions to their respective first fastening means, said hopper means when in normal mounted engagement with the pivotally mounted mounting means being capable of engaging same on both sides of said pivot axis to limit the free swinging movement thereof and maintain same in mounted engagement therewith, said hopper means being dismountable from said pivotally mounted mounting means by swinging a portion of said pivotally mounted means away from and out of engagement with a portion of its respective second fastening means and simultaneously flexing said resilient wall structure and moving the remainder of said second fastening means away from and out of engagement with the remainder of said pivotally mounted mounting means.

6. Material conveying means for use with a generally vertical supporting wall having an opening therein for the passage of fluent material therethrough, said means comprising hopper means having a bottom wall and generally U-shaped resilient side wall structure extending upwardly therefrom, the free end portions of said side wall structure defining an opening in said hopper means for communication with the opening in said supporting wall, and mounting means mountable on said supporting wall on opposite sides of the opening therein for mounting said hopper means thereon, the mounting means on one side of said opening being pivotally mountable for free swinging movement about an axis disposed intermediate the ends thereof, said mounting means providing first fastening means on opposite sides of said opening which face in opposite directions, said resilient wall structure carrying second fastening means on opposite sides thereof adapted for cooperative mounting engagement with said first fastening means, said second fastening means facing in opposite directions from each other and in opposite direction to their respective first fastening means, said fastening means providing cooperating male and female portions, said hopper means when in normal mounted engagement with the pivotally mounted mounting means being capable of engaging same on both sides of said pivot axis to limit the free swinging movement thereof and maintain same in mounted engagement therewith, said hopper means being dismountable from said pivotally mounted mounting means by swinging a portion of said pivotally mounted means away from and out of engagement with a portion of its respective second fastening means and simultaneously flexing said resilient wall structure and moving the remainder of said second fastening means away from and out of engagement with the remainder of said pivotally mounted mounting means.

7. Material conveying means for use with a generally vertical supporting wall having an opening therein for the passage of fluent material therethrough, said means comprising hopper means which includes the bottom wall and resilient generally U-shaped side wall structure extending upwardly therefrom, the free end portions of said side wall structure defining an opening for the passage of material between said hopper means and the opening in said supporting wall, elongate hopper mounting members vertically mountable on said supporting wall on opposite sides of the opening therein, one of said mounting members being pivotally mountable for free swinging movement about an axis disposed intermediate the ends thereof, said mounting members providing first fastening means on opposite sides of said opening, said resilient wall structure carrying elongate second fastening means adapted for cooperative engagement with said first fastening means for mounting said hopper means on said mounting members and supporting wall, said fastening means providing cooperating slots and flange elements, said hopper means when in normal mounted engagement with the pivotally mounted member being capable of engaging same above and below said pivot axis to limit the free swinging movement thereof and maintain same in mounted engagement therewith, said hopper means being dismountable from said pivotally mounted member by swinging the lower portion of said pivotally mounted member away from and out of engagement with the lower portion of its respective second fastening means and simultaneously flexing the upper portion of said resilient wall structure and moving the remaining upper portion of said second fastening means away from and out of engagement with the remaining upper portion of said pivotally mounted member.

8. The material conveying means of claim 7 wherein said slots and flange elements are in free sliding relationship with each other whereby said hopper means is free to slide upwardly relative to said supporting wall.

9. Material conveying means for use with a generally vertical supporting wall having an opening therein for the passage of fluent material therethrough, said means comprising hopper means which includes a bottom wall and resilient generally U-shaped side wall structure extending upwardly therefrom, the free end portions of said resilient wall structure defining an opening for the passage of material between said hopper means and the opening in said supporting wall, said side wall structure having mounted thereon on opposite sides thereof laterally outwardly extending elongate generally vertically disposed flanges, and elongate mounting members vertically mountable on said supporting wall on opposite sides of the opening therein, said mounting members providing oppositely facing vertically disposed slots for cooperatively receiving said flanges for mounting said hopper means on said mounting members and supporting wall, one of said mounting members being pivotally mountable on said supporting wall for free swinging movement relative thereto, the pivot axis of said member being located intermediate the ends thereof whereby a portion thereof is disposed above said pivot axis, said hopper means when normally mounted on said mounting members being capable of engaging the pivotally mounted mounting member above and below its pivot axis to limit the free swinging movement thereof and maintain same in mounted engagement therewith, said pivotally mounted member being swingable to an inclined position and its corresponding flange being tiltable by flexing of said side wall to a corresponding inclined position in which said pivotally mounted member and its respective flange are disengagably opposed, said side wall when so flexed being tensioned such as to bias said flange towards and into normal vertical mounted position when released for free movement.

10. The material conveying means of claim 9 wherein said flanges are freely slidable in said slots and said hopper means is free to slide upwardly relative to said supporting wall when mounted thereon.

11. The material conveying means of claim 9, including an elongate transversely disposed slot formed in said pivotally mounted member beneath the pivot axis thereof, a first fastening element mounted on said supporting wall and seated in said slot in sliding relationship therewith, and releasable locking means mountable on said fastening means and engageable with said pivotally mounted member for positively locking said pivotally mounted member in normal vertical mounted position.

12. Material conveying means for use with a supporting wall having an opening therein for the passage of fluent material therethrough, said means comprising first mounting means adapted to be fixedly mounted on said wall on one side of said opening, second mounting means adapted to be pivotally mounted on said wall on the opposite side of said opening, said mounting means providing opposed guide slots on opposite sides of said opening and a hopper having resilient generally U-shaped wall structure having flange means extending laterally outwardly from each free end portion thereof, said free end portions and the flanges carried thereon being capable of resilient movement towards and away from each other between a normal mounted expanded position and a contracted mounting and dismounting position, said flange means being adapted for insertion into the slots of said mounting means for free sliding cooperative mounted engagement therewith, said hopper and second mounting means when so engaged being cooperatively inter-related whereby said hopper limits the free pivotal movement of said second mounting means and thereby maintains said second mounting means in cooperative mounted engagement therewith, said second mounting means and its respective flange means being capable of being cooperatively engaging and disengaged by swinging movement of said second mounting means to a position wherein a portion of its respective flange means is disengaged therefrom and by simultaneous contraction of said free end portions of said hopper wall structure until the remainder of said flange means is disengaged from said second mounting means.

13. Material conveying means for use with a generally vertical supporting wall having an opening therein for the passage of fluent material therethrough, said means comprising an elongate mounting member adapted to be fixedly and vertically mounted on said wall on one side of said opening, a second elongate mounting member adapted to be pivotally mounted on said wall on the opposite side of said opening, said mounting members providing opposed guide slots on opposite sides of said opening, said second member being adapted to assume a normal vertical mounted position, the pivot axis of said second member being located intermediate the ends thereof and dividing the member into upper and lower portions, and a hopper which includes a bottom wall and a resilient generally U-shaped side wall extending upwardly from said bottom wall, the free end portions of said hopper side wall having laterally outwardly extending elongate flanges adapted for lateral insertion into said guide slots of said mounting members for free sliding cooperative mounted engagement therewith, said hopper being capable of being mounted on said mounting members by the lateral insertion of one of said flanges into the guide slots of the fixedly mounted member followed by swinging of the lower end portion of said second member outwardly and away from its normal mounted position to a position where at least a portion thereof is in non-overlapping relationship with a lower portion of its respective flange, and simultaneous flexing of the upper portion of said side wall so as to move the upper portion of said flange and side wall structure towards the other side and away from the upper portion of said second member until said second member and its respective flange are in completely non-overlapping relationship, whereupon said flange is laterally insertable in the guide slot of said second member by the release of said upper portion of said side wall from contacted position thereby causing said hopper to return to its normal mounted position, the return of said hopper to said normal position causing the upper portion of said hopper to engage the upper portion of said second member, thereby causing said second member to pivot about its axis and return to its normal mounted vertical position, said hopper and second mounting member when in mounted engagement with each other being cooperatively inter-related whereby said hopper limits the free pivotal movement of said second member and maintains same in cooperative mounted engagement therewith.

14. The material conveying means of claim 13, wherein the lower portion of said second member is provided with an elongate transversely extending slot, and including releasable fastening means carried by said supporting wall and seated in said slot which is slidable relative thereto, said fastening means being capable of being tightened against said second member to positively engage and hold said second member in normal vertical mounted position, and capable of being loosened to permit free swinging movement thereof for mounting and dismounting of said hopper.

References Cited in the file of this patent

UNITED STATES PATENTS

| | | |
|---|---|---|
| 2,594,858 | Bowman | Apr. 29, 1952 |
| 2,821,433 | Hamlet | June 28, 1958 |
| 3,090,527 | Rensch | May 21, 1963 |

FOREIGN PATENTS

| | | |
|---|---|---|
| 10,414 | Great Britain | Sept. 6, 1906 |

UNITED STATES PATENT OFFICE
CERTIFICATE OF CORRECTION

Patent No. 3,151,779                                October 6, 1964

Joseph T. Rensch et al.

It is hereby certified that error appears in the above numbered patent requiring correction and that the said Letters Patent should read as corrected below.

Column 5, line 33, for "sad" read -- said --; column 8, line 19, for "engaging" read -- engaged --; line 61, for "contacted" read -- contracted --.

Signed and sealed this 19th day of January 1965.

(SEAL)
Attest:

ERNEST W. SWIDER                              EDWARD J. BRENNER
Attesting Officer                                     Commissioner of Patents